United States Patent [19]

Torcomian

[11] 4,024,620
[45] May 24, 1977

[54] METHODS FOR MANUFACTURING REFRIGERATING SYSTEMS

[75] Inventor: Albert Torcomian, Havertown, Pa.

[73] Assignee: Environmental Container Corporation, New York, N.Y.

[22] Filed: June 11, 1975

[21] Appl. No.: 586,135

Related U.S. Application Data

[62] Division of Ser. No. 444,875, Feb. 22, 1974, Pat. No. 3,902,332.

[52] U.S. Cl. .................... 29/157.3 C; 29/157.3 D; 62/451; 156/257; 156/286; 165/136
[51] Int. Cl.² ................................. B23P 15/26
[58] Field of Search ............... 29/157.3 C, 157.3 D; 62/451; 156/286, 293, 257; 165/136

[56] References Cited

UNITED STATES PATENTS

| | | | |
|---|---|---|---|
| 1,800,150 | 4/1931 | Musgrave et al. | 29/157.3 C |
| 2,435,170 | 1/1948 | Wachs et al. | 165/136 |
| 2,783,176 | 2/1957 | Bokey | 156/286 |
| 2,806,360 | 9/1957 | Armentrout | 62/451 |
| 3,698,475 | 10/1972 | Beck, Jr. | 29/157.3 C |

FOREIGN PATENTS OR APPLICATIONS 1,066,524  10/1959  Germany ............ 29/157.3 C Primary Examiner—C.W. Lanham
Assistant Examiner—Daniel C. Crane
Attorney, Agent, or Firm—Steinberg & Blake

[57] ABSTRACT

A method for manufacturing a refrigerating system. According to the method, adhesive is applied either to outer faces of an intermediate insulating body or to inner faces of a pair of outer metal skins which are to engage the outer faces of the insulating body to form a wall structure therewith, or to all of these faces. Evaporator and condenser coils are introduced into grooves of the insulating body at opposed faces thereof so as to directly engage the metal skins. These coils may be introduced either before or after the application of the adhesive. Then after the skins are applied to the assembly of the insulating body and coils, the assembled insulating body, coils, and skins are situated in an evacuated atmosphere for eliminating any air bubbles in the adhesive while tightly pressing the metal skins against the insulating body and coils.

3 Claims, 9 Drawing Figures

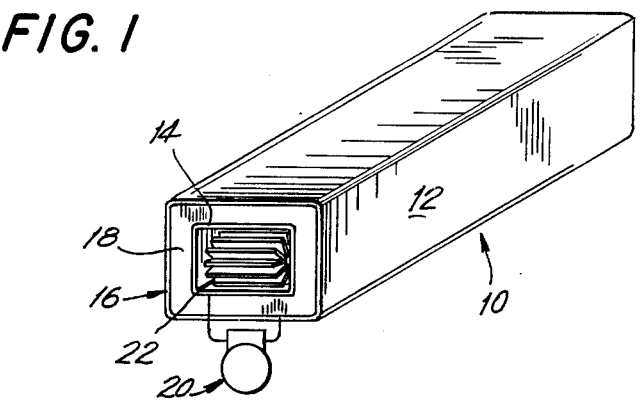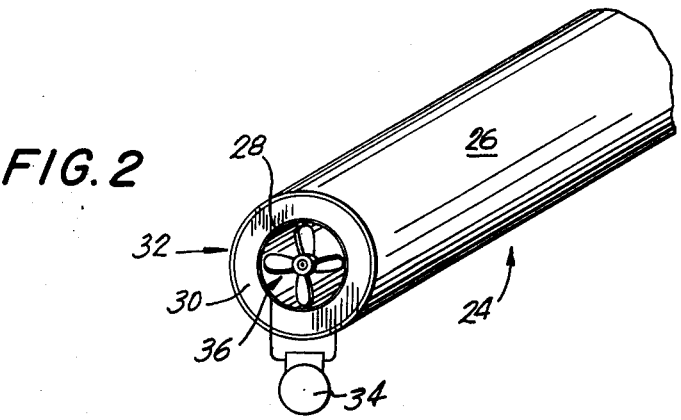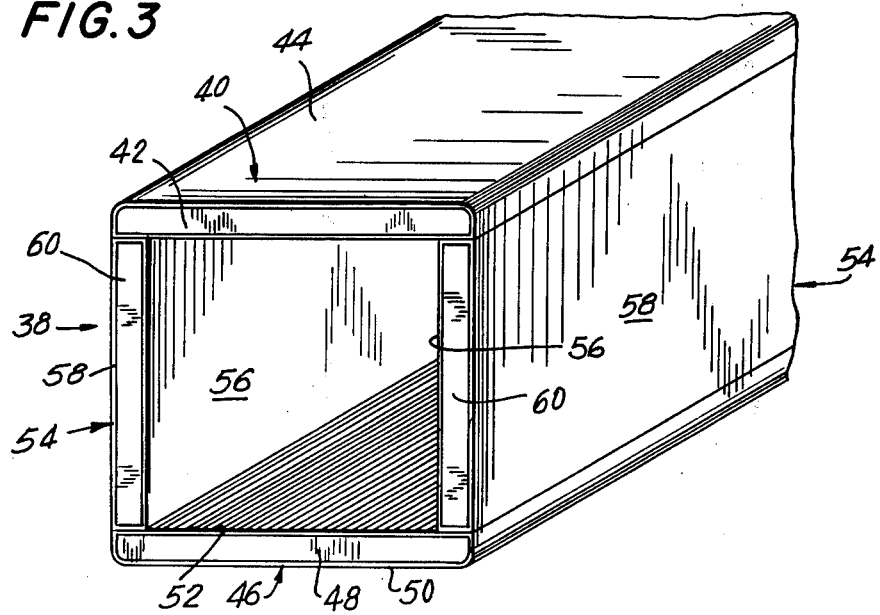

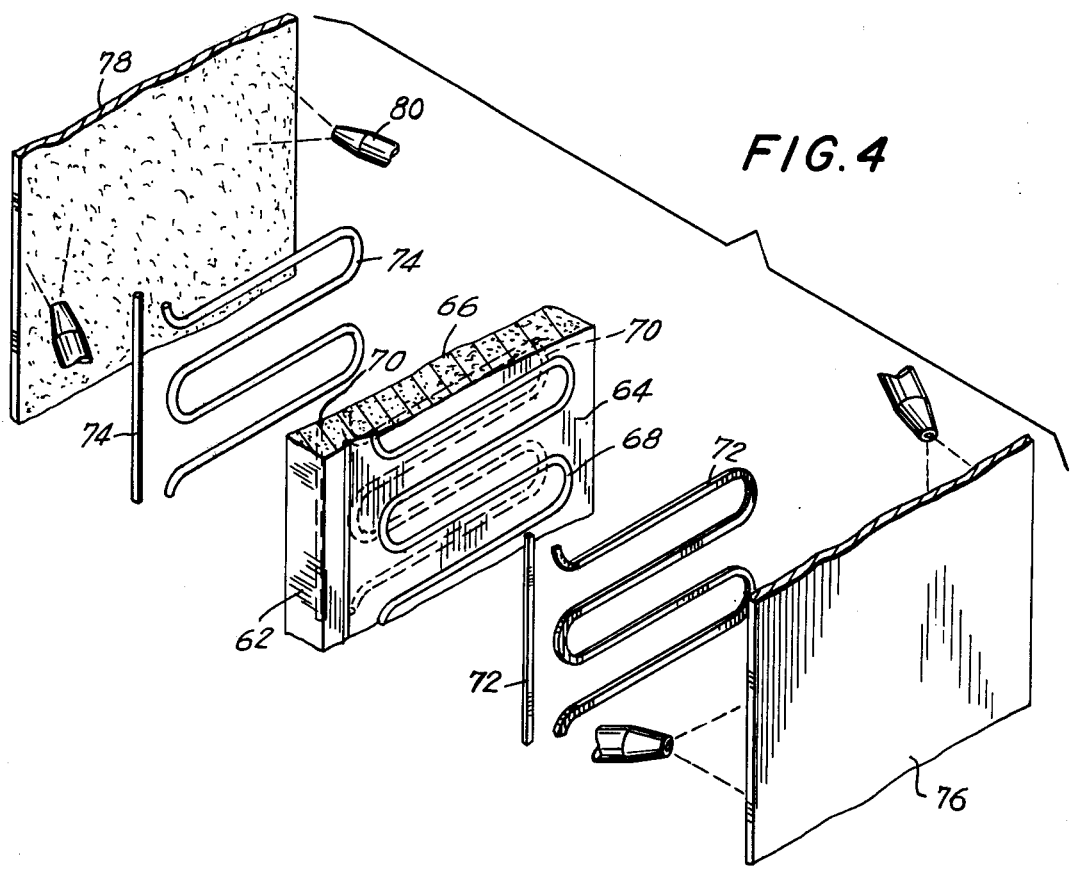
FIG. 4
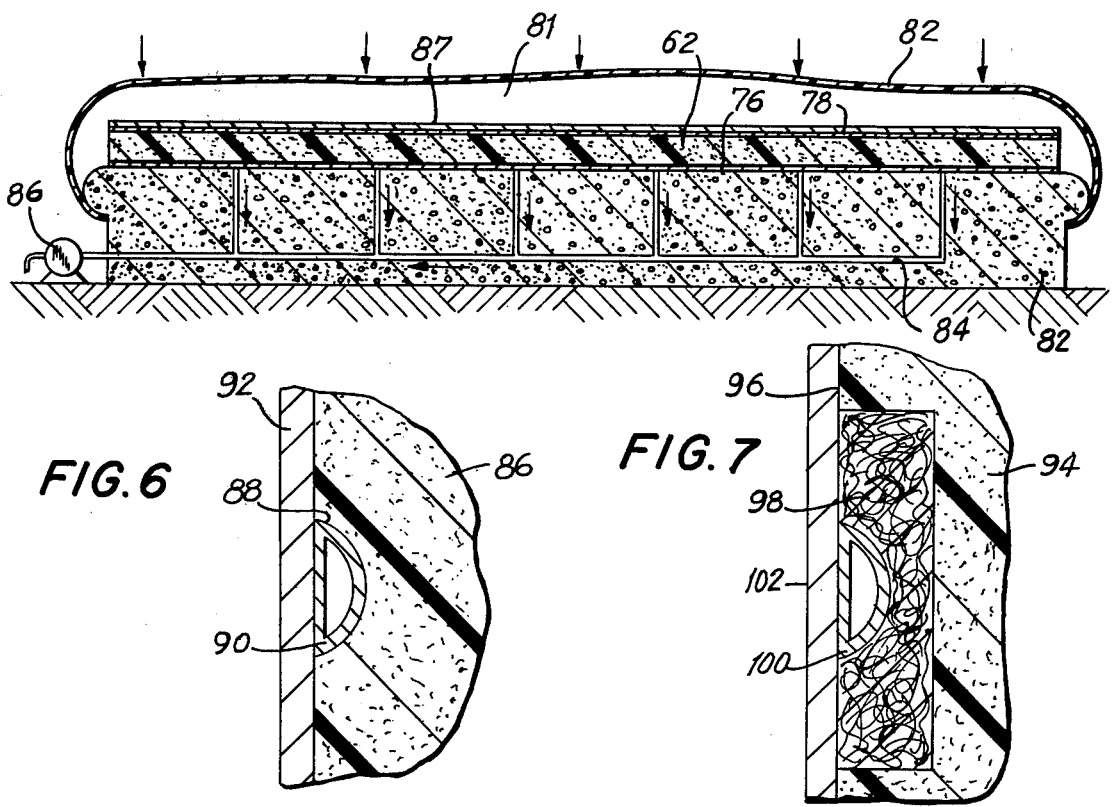
FIG. 5
FIG. 6
FIG. 7

4,024,620

METHODS FOR MANUFACTURING REFRIGERATING SYSTEMS

CROSS REFERENCE TO RELATED APPLICATION

This application is a division of copending application Ser. No. 444,875, filed Feb. 22, 1974, now Pat. No. 3,902,332, issued Sept. 2, 1975, and entitled "REFRIGERATING SYSTEMS".

BACKGROUND OF THE INVENTION

The present invention relates to methods for manufacturing refrigerating systems.

As is well known, there are many situations where it is desirable to provide refrigerated atmospheres for purposes such as preventing spoilage of food products, air conditioning interior spaces, and the like. However, at the present time considerable difficulties are encountered because of the fact that the conventional refrigerating units can be connected to the spaces which are to be refrigerated only with difficulty and with considerable lack of efficiency. For example in the case of transporting food products considerable loss of efficiency and difficulties are encountered in refrigerating the interior of a truck trailer or the interior of a railroad car. Thus, special constructions are required for such trailers or railroad cars, or for truck bodies which are not in the form of a trailer, and the refrigerating unit itself must be properly hooked up to the specially constructed bodies of the vehicles, occupying an undesirably large amount of space and operating with poor efficiency, so that undesirable costs are encountered. Also in the case of air conditioners it is conventional to provide special fans which direct the air which is to be chilled over coils in order to be cooled thereby before being distributed through suitable duct systems to the spaces which are to be cooled. Such conventional air conditioning systems also operate at less than a desirable efficiency and create problems with respect to heat losses and desirable flow of the air which is to be cooled with respect to the structure which cools the same.

SUMMARY OF THE INVENTION

It is accordingly a primary object of the present invention to provide methods for manufacturing structures capable of avoiding the above drawbacks by providing highly efficient relatively simple structures capable of refrigerating an interior space, whether this space forms, for example, part of a duct through which air is directed to be cooled or part of a container in which food products or the like are stored to prevent spoilage thereof.

In particular it is an object of the present invention to provide a method for manufacturing a construction according to which a considerable part of the refrigerating structure itself is formed by the wall structure of the duct, container, or the like, so that a minimum amount of refrigerating structure need be located at the exterior of and hooked up to such a wall structure while at the same time efficiency is increased and costs are reduced.

Furthermore it is an object of the present invention to provide a highly effective method for manufacturing a structure of the above type so that it will have a superior construction capable of operating with a high degree of efficiency while at the same time lending itself to manufacture at a relatively low cost.

In accordance with the method of the invention, in order to provide a refrigerating assembly of the above type, either before or after the coils are situated in grooves of an intermediate wall region, an adhesive is applied to the opposed faces thereof and/or to surfaces of metal skins which are to engage these opposed faces, and then while the skins engage the intermediate insulating wall region and/or the coils in the grooves thereof, before the adhesive has set, the entire assembly is placed in an evacuated atmosphere which serves on the one hand to eliminate any bubbles in the adhesive and on the other hand to tightly press the metal skins against the coils and intermediate insulating region of the wall structure to provide in this way a highly efficient construction where part of the wall structure itself forms the evaporator and condenser of the refrigerating assembly.

BRIEF DESCRIPTION OF DRAWINGS

The invention is illustrated by way of example in the accompanying drawings which form part of this application and in which:

FIG. 1 is a fragmentary perspective and schematic illustration of one embodiment of a duct system to be used for air conditioning purposes and capable of being manufactured in accordance with the method of the invention;

FIG. 2 is a fragmentary perspective schematic illustration of another embodiment of a duct system to be used for air conditioning purposes and capable of being manufactured according to the method of the invention;

FIG. 3 is a fragmentary perspective illustration of part of a container manufactured according to the method of the invention and adapted to receive in its interior food products or the like which are to be refrigerated in accordance with the invention;

FIG. 4 is an exploded fragmentary perspective illustration of part of the method of the invention;

FIG. 5 is a schematic sectional elevation of a stage of the method of the invention subsequent to that of FIG. 4;

FIG. 6 is a fragmentary sectional illustration showing in detail one possible refrigerating structure manufactured according to the method of the invention;

FIG. 7 is a fragmentary sectional illustration of another embodiment of a refrigerating structure manufactured according to the method of the invention;

DESCRIPTION OF PREFERRED EMBODIMENTS

Figure 8:
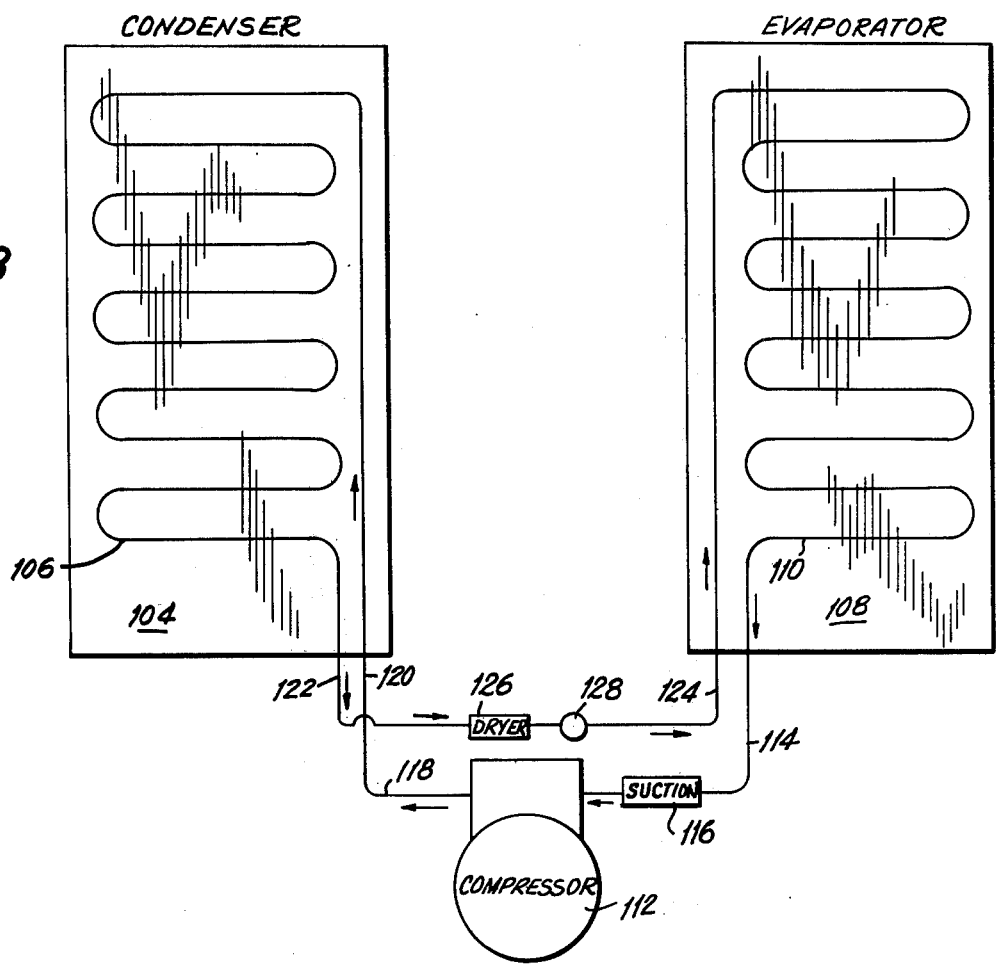
FIG. 8 is a schematic representation of one type of refrigerating system adapted to be used in connection with relatively small refrigerating containers.

Referring first to FIG. 1, there is illustrated therein an elongated duct 10 which in the illustrated example is of a rectangular cross-sectional configuration. This duct 10 has an exterior surface region 12 formed in part by a metal skin and an interior surface region 14 which also is formed in part by a metal skin. The exterior surface region 12 and the interior surface region 14 of the illustrated tubular wall structure 16 which forms the duct 10 are separated from each other by an intermediate region 18 of the wall means 16, this intermediate region 18 being made of a thermal insulating body so that the intermediate region 18 insulates the exterior surface region 12 and the interior surface region 14 from each other. As will be apparent from the description which follows the intermediate insulating region 18 may be made of a foam plastic such as a closed-cell urethane, while part of the exterior surface region 12 can be formed by an outer metal skin of aluminum, for example, with part of the interior surface region 14 being formed by a metal skin which also may be made of aluminum.

As will be apparent from the description below, the exterior surface region 12 includes not only the illustrated metal skin but suitable condenser coils while the interior surface region 14 includes in addition to the illustrated metal skin 14 suitable evaporator coils, and the condenser means and evaporator means which are formed in part by the exterior surface region 12 and interior surface region 14 of the wall means 16 communicate with a compressor means 20 as shown schematically in FIG. 1 so that the compressor means 20 together with the above evaporator means and condenser means forms a refrigerating assembly capable of refrigerating the interior space which is defined at least in part by the interior surface region 14 of the wall means 16.

As is shown schematically in FIG. 1, a blower 22 forms an air-moving means for moving air through the duct 10. Thus, the refrigerating circuit which includes the compressor means 20 also includes the condenser means at the exterior surface region 12 and the evaporator means at the interior surface region 14 of the wall means 16, and this refrigerating assembly will reduce the temperature of the air within the duct means 10 so as to chill the air thus enabling the duct means 10 to carry out an air-conditioning function.

According to the embodiment which is illustrated in FIG. 2, the elongated tubular duct 24 is of a circular cross section and has an exterior surface region 26 corresponding to the exterior surface region 12 as well as an interior surface region 28 corresponding to the interior surface region 14, these surface regions 26 and 28 being insulated from each other by an intermediate insulating region 30 of the illustrated tubular wall means 32 which thus is the same as the wall means 16 except that it is of a circular cross section configuration rather than a rectangular cross sectional configuration. The exterior surface region 26 includes a tubular metal skin of aluminum, for example, which is circular in cross section and which engages condenser coils embedded in an outer face of the tubular intermediate insulating wall region 30 which may be made of urethane, thus being of the same material as the intermediate wall region 18. The interior surface region 28 includes also an inner tubular metal skin of circular cross section engaging the evaporator coils embedded at an inner face of the insulating body 30 and engaging the metal skin. The compressor means 34 communicates with the coils of the condenser means which includes the exterior surface region 26 and the evaporator means which includes the interior surface region 28 of the wall means 32 so as to circulate a suitable refrigerant therethrough. As is shown schematically in FIG. 2 a suitable fan 36 is situated at part of the interior space defined by the inner surface region 28 for driving air therethrough to be refrigerated in the manner described above in connection with FIG. 1.

Referring to FIG. 3, there is illustrated therein in a fragmentary schematic manner part of a container 38 adapted to store in its interior perishables, for example, such as food products and the like, so that when this container is situated in a freight car or on a suitable truck, the products stored in the container 38 will not spoil.

In the illustrated example the container 38 has an upper wall structure 40 which may be made of a suitable interior insulating body 42 which is surrounded and engaged by a suitable exterior skin 44 made of any suitable metal, for example.

In addition the container 38 has a floor structure 46 made also of an interior insulating body 48 surrounded and engaged by a suitable covering 50 which may be in the form of a metal skin also. However, it is preferred to provide the inner surface region 52 of the floor structure 46 with extrusions formed so as to provide grooves which extend longitudinally along the interior of the container for providing a more efficient support of the food products and for collecting moisture which may settle between the grooves of the extrusions used for this purpose.

Each of the opposed side wall structures 54 of the container 38 have a construction in accordance with the method of manufacture of the present invention in the illustrated example, although it is of course equally possible to provide such a structure not only at the side walls 54 but also at the top wall 40 in the bottom wall 46. The ends of the container 38 are not illustrated. These ends can take any desired construction for tightly closing the interior space of the container 38, and this container may be provided with any suitable door through which access may be had to the interior of the container 38. Such a door may be formed for example, by the upper wall structure 40 or by one of the unillustrated end walls.

The side walls 54 are each provided with an interior surface region 56 and an exterior surface region 58 separated by an intermediate insulating wall region 60. Thus the interior and exterior surface regions of the wall structures 54 may include metal skins of aluminum or the like which directly engage coils embedded in the opposed faces of the intermediate insulating regions 60 which may be made of a foam urethane, for example. The unillustrated coils which engage the interior skin at the inner surface region 56 of each wall structure 54 form therewith an evaporator means while the unillustrated coils which engage the exterior metal skin at the exterior surface region 58 form therewith a condenser means, and this evaporator means and condenser means at each wall region communicates with a compressor as described above in connection with FIGS. 1 and 2 so that in this way the interior space of the container 38 can be refrigerated.

FIG. 4 illustrates schematically further details of any of the above wall means 16, 32, or 54, as well as part of the method for manufacturing the same. Thus any of the above wall means includes the intermediate insulating body fragmentarily illustrated in FIG. 4 by the intermediate insulating body 62 made, for example, of a closed-cell urethane. This body of thermal insulating material 62 has an outer face 64 which is visible in FIG. 4 and an opposed inner face 66. These faces 64 and 66 are suitably routed so as to be formed with grooves 68 and 70, respectively. These grooves match the configuration of coils 72 and 74, respectively. Thus after the grooves 68 and 70 are formed the coils 72 and 74 can be seated therein.

FIG. 4 shows an outer metal skin 76 made of aluminum, for example, this skin 76 being adapted to engage the coils 72 as well as the outer face 64 of the insulating body 62. Also FIG. 4 illustrates an inner metal skin 78 made of aluminum, for example, and adapted to engage the coils 74 as well as the face 66 of the body 62.

As is shown in FIG. 4 an adhesive in the form of a suitable glue, for example, is applied, as by being sprayed from nozzles 80 to the surfaces of the skins 76 and 78 which are respectively to engage the faces 64 and 66. This adhesive may also be applied to the faces 64 and 66, and the application of the adhesive may take place either before or after the coils 72 and 74 are received in the grooves 68 and 70, respectively.

Thus it will be seen that with the structure of FIG. 4 the coils 72 together with the skin 76 will form the exterior surface region of a wall means such as the wall means 16, 32, or 54, and this construction will form a condenser means of the refrigerating assembly. On the other hand, the coils 74 together with the inner metal skin 78 will form an evaporator means of the refrigerating assembly.

With the coils 72 and 74 thus assembled in the grooves of the insulating body 62 and with the skins 76 and 78 respectively engaging the outer face 64 and inner face 66 of the body 62, the resulting assembly is placed in an evacuated atmosphere 81 shown in FIG. 5 in a schematic manner. Thus the evacuated atmosphere 81 may be created between a plastic sheet 82 which is impervious to air and which is fluid-tightly connected with a base 82 made of concrete, for example, and formed with suitable suction passages 84 communicating with a suction pump 86. The sheet 82, before being tightly assembled with the base 82 is separated from the base to permit the assembly of FIG. 4 to be situated in the space 81. Thus FIG. 5 shows the intermediate insulating body 62 between the metal skins 76 and 78, with the coils 72 and 74 being omitted from FIG. 5 for the sake of clarity. The introduction of this assembly of FIG. 4 into the atmosphere 81 takes place prior to setting and drying of the adhesive applied by way of the spray nozzles 80.

In addition, FIG. 5 shows a board 87 made of plywood, for example, and resting on the metal skin 78. The upper ends of the bores 84 are situated beyond the assembly of components 62, 76 and 78 so that the space 81 will communicate freely through the bores 84 with the suction pump 86.

As a result of the creation of the evacuated atmosphere 81, the exterior atmospheric pressure will tightly press the skins 76 and 78 against the insulating body 62, with the distribution of the pressure being enhanced by way of the board 87 which acts in the nature of a platen pressing the entire assembly against the top surface of the base 82. The result is not only a tight engagement between the metal skins and the insulating body but also the elimination of any bubbles in the adhesive which might not be favorable to the desired thermal conditions. After elapse of a suitable time the entire assembly is removed from the atmosphere 81 and another assembly is introduced to be tightly assembled together in the evacuated atmosphere 81 while the adhesive sets, so that the finished wall means can be removed from the evacuated atmosphere 81 without any danger of the parts becoming separated from each other.

As is shown in FIG. 6, the intermediate insulating wall region 86, made of a suitable closed-cell urethane, for example, may be formed in each of its opposed faces with grooves 88 of semicircular cross section for receiving a coil structure 90 which may be either the coil 72 or the coil 74. This coil structure 90 has a cross section matching that of the groove 88. Initially the flat outer surface of the coil 90 may be situated slightly beyond the face of the insulating body 86 which is engaged by the metal skin 92 which may be either the metal skin 76 or the metal skin 78. Because of the fact that the foam plastic insulating body 86 is compressible to some extent during the assembly of the parts in the evacuated atmosphere 81 the skin 92 will engage the entire exposed surface of the body 86 pressing the coil 90 into the groove 88 to achieve an assembly as illustrated in FIG. 6.

However, it is also possible to provide an arrangement as shown in FIG. 7 according to which the insulating foam plastic body 94 has grooves 96 of substantially rectangular cross section receiving a metal wool filler 98 in which the coil 100 is seated, this coil 100 also having the same cross section as the coil 90 so that it has a flat surface to engage the metal skin 102 which is adhered to a face of the body 94 in the manner described above. Thus, with either of the structures of FIGS. 6 and 7 there will be a highly efficient thermal connection between the coils and the metal skins. With the embodiment of FIG. 7 in particular the metal wool filler 98 will provide an exceedingly effective thermal connection while the embodiment of FIG. 6 is also highly effective because of the large area of contact between the flat surface of the coil 90 and the flat surface of the skin 92.

In connection with FIG. 7 it is to be noted that the metal wool filler 98 may be made of any suitable metal such as copper, steel, aluminum, or the like.

FIG. 8 illustrates schematically a basic refrigerating assembly for a relatively small container. Thus FIG. 8 shows at the left a thermally conductive metal skin 104 which forms part of a condenser means. This metal skin 104 of the illustrated condenser means directly engages the coils 106 which are embedded in an insulating body which is not illustrated in FIG. 8, in the manner described above in connection with FIGS. 6 and 7, with the metal skin 104 engaging the insulating body as was described above in connection with FIGS. 4-7.

At the right FIG. 8 shows an evaporator means which includes the thermally conductive metal skin 108 which directly engages the evaporator coils 110, this structure of the skin 108 and coils 110 engaging the surface of the insulating body which is opposed to that which engages the components 104, 106. FIG. 8 shows the elctrically driven compressor means 112. The evaporator coil 110 has an outlet 114 communicating with the compressor 112 through a suction accummulator unit 116. The discharge 118 of the compressor 112 communicates with an inlet 120 of the condenser coils 106. The discharge 122 of the condenser coils 106 communicates with an inlet 124 of the evaporator coils through a dryer unit 126 in which dehydration takes place as well as through a TX valve or capillary tube 128 provided in a known way to achieve expansion of the fluid flowing through the inlet 124 into the evaporator coil 110. In this way a suitable refrigerant such as Freon, for example, can be circulated through the condenser means and evaporator means of FIG. 8 by way of the compressor means 112. Of course this system can be used with any of the above-described embodiments of FIGS. 1-3.

Figure 9:
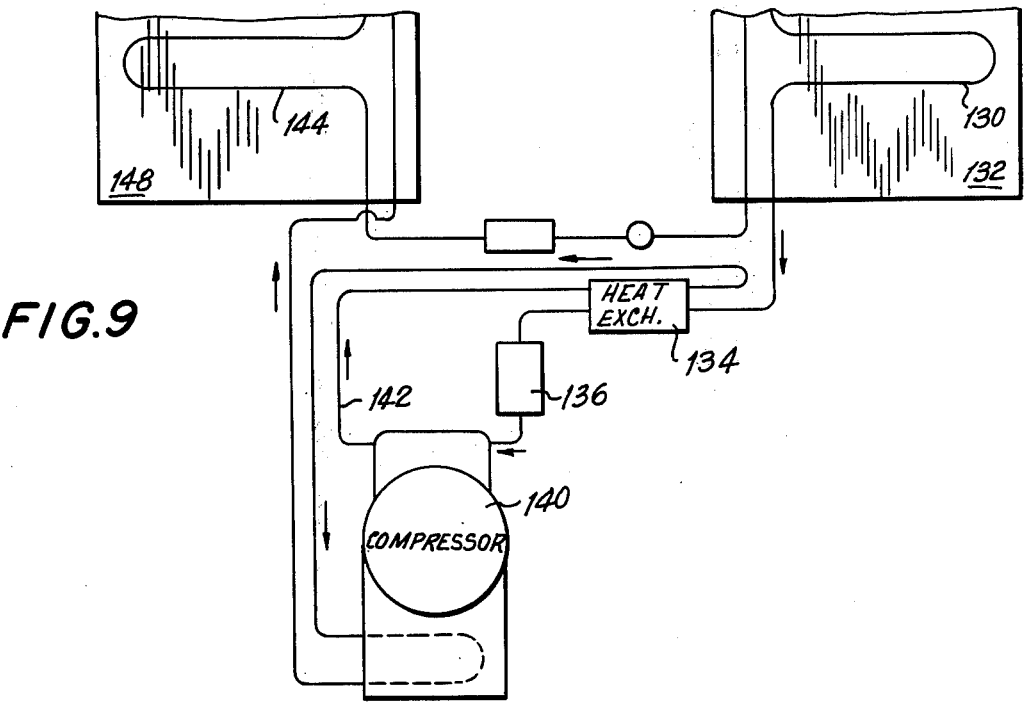
FIG. 9 is a partly fragmentary schematic illustration of a system which is adapted to be used for a refrigerating system designed for relatively large containers.

FIG. 9 shows a system similar to that of FIG. 8 but altered to provide a refrigerating cycle suitable for large containers. Thus in the case of FIG. 9 the evaporator coils 130 engage a metal skin 132 forming the interior surface region of a wall means which is larger than that of FIG. 8. The discharge of the evaporator coil 130 flows through a heat exchanger 134 before reaching the suction accumulator 136 which corresponds to the suction accumulator 116 of FIG. 8. From the suction accumulator 136 the refrigerant flows to the electrical compressor means 140 which corresponds to the compressor means 112 except that it is of a larger size and greater capacity. The discharge 142 of the compressor means returns the refrigerant through the heat exchanger unit 134 so that heat exchange takes place between the inlet and outlet of the compressor 140, before the refrigerant flows from the compressor in the direction illustrated to the inlet of the condenser coils 144 which correspond to the coils 106 and which engage the illustrated metal skin 148 which corresponds to the metal skin 104. These alterations of FIG. 9 with respect to the illustration of FIG. 8 enable the system of FIG. 9 to be suitable for use with relatively large refrigerator containers.

Thus it will be seen that with all of the above-described embodiments of the method of manufacture of the invention the wall means which surrounds and at least partly defines the interior space whose temperature is to be reduced includes an inner surface region which forms an evaporator means and an outer surface region which forms a condenser means, the latter evaporator and condenser means communicating with the compressor means, so that in this way a highly effective refrigerating system can be achieved for practically any desired purpose.

I claim:

1. In a method of manufacturing for a refrigerating system a wall structure which includes an intermediate insulating body having outer faces and a pair of outer metal skins which respectively have inner faces for respectively engaging said outer faces so that each outer face and inner face engaging the same forms a pair of faces, the step of forming in said outer faces of said intermediate insulating body grooves of a given depth having a configuration matching that of coils to be received in said grooves, then performing in a given sequence the steps of applying an adhesive to at least one of each of said pair of faces and introducing evaporator and condenser coils into said grooves of said insulating body respectively at said outer faces thereof for directly engaging the metal skins, then, after performing said steps in said predetermined sequence applying the skins to the assembly of the insulating body and coils, and situating the assembled insulating body, coils, and skins in an evacuated atmosphere for eliminating any air bubbles in the adhesive while tightly pressing the metal skins against the insulating body and coils, said insulating body being compressible to a limited degree, and including the step of making said grooves initially of a lesser depth than that required to seat said coils in said grooves flush with said outer faces of said insulating body, and pressing said skins against the insulating body in said evacuated atmosphere with a force sufficient to compress the insulating body to increase the depth of said grooves while said coils become fully seated therein and said metal skins are pressed flush against said outer faces of said insulating body.

2. In a method as recited in claim 1 and including the step of supporting one of said skins on a supporting surface while placing a platen against the other of said skins, while said assembled insulating body, coils, and skins are in said evacuated atmosphere, for distributing the force which tightly presses the metal skins against the insulating body and coils in said evacuated atmosphere.

3. In a method as recited in claim 1 and wherein the coils respectively have flat exterior surfaces, and including the step of situating said coils in said grooves with said flat exterior surfaces of said coils directed toward said metal skins to achieve a large area of contact between said skins and coils.

* * * * *